United States Patent
Henry et al.

(10) Patent No.: US 11,061,853 B2
(45) Date of Patent: Jul. 13, 2021

(54) PROCESSOR WITH MEMORY CONTROLLER INCLUDING DYNAMICALLY PROGRAMMABLE FUNCTIONAL UNIT

(71) Applicant: VIA ALLIANCE SEMICONDUCTOR CO., LTD., Shanghai (CN)

(72) Inventors: G. Glenn Henry, Austin, TX (US); Rodney E. Hooker, Austin, TX (US); Terry Parks, Austin, TX (US); Douglas R. Reed, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 80 days.

(21) Appl. No.: 15/590,883

(22) Filed: May 9, 2017

(65) Prior Publication Data

US 2017/0308314 A1 Oct. 26, 2017

Related U.S. Application Data

(63) Continuation-in-part of application No. 15/337,140, filed on Oct. 28, 2016, now Pat. No. 10,642,617.

(Continued)

(51) Int. Cl.
*G06F 15/78* (2006.01)
*G06F 3/06* (2006.01)
(Continued)

(52) U.S. Cl.
CPC .......... *G06F 15/7871* (2013.01); *G06F 9/22* (2013.01); *G06F 9/3017* (2013.01);
(Continued)

(58) Field of Classification Search
CPC ............... G06F 3/0604; G06F 15/7867; G06F 15/7871; H03K 19/17728; H03K 19/17748; H03K 19/17752
See application file for complete search history.

(56) References Cited

U.S. PATENT DOCUMENTS 5,802,569 A 9/1998 Genduso et al.
5,819,097 A 10/1998 Brooks et al.
(Continued)

FOREIGN PATENT DOCUMENTS

CN 103176752 A 6/2013

OTHER PUBLICATIONS

Mahdi Nazm Bojnordi and Engin Ipek. 2013. A programmable memory controller for the DDRx interfacing standards. ACM Trans. Comput. Syst. 31, 4, Article 11 (Dec. 2013), 31 pages. (Year: 2013).*

(Continued)

*Primary Examiner* — William B Partridge
*Assistant Examiner* — Kasim Alli
(74) *Attorney, Agent, or Firm* — McClure, Qualey & Rodack, LLP

(57) ABSTRACT

A processor including a memory controller for interfacing an external memory and a programmable functional unit (PFU). The PFU is programmed by a PFU program to modify operation of the memory controller, in which the PFU includes programmable logic elements and programmable interconnectors. For example, the PFU is programmed by the PFU program to add a function or otherwise to modify an existing function of the memory controller enhance its functionality during operation of the processor. In this manner, the functionality and/or operation of the memory controller is not fixed once the processor is manufactured, but instead the memory controller may be modified (Continued)

after manufacture to improve efficiency and/or enhance performance of the processor, such as when executing a corresponding process.

16 Claims, 6 Drawing Sheets

Related U.S. Application Data

(60) Provisional application No. 62/264,816, filed on Dec. 8, 2015.

(51) Int. Cl.
  *G06F 9/30* (2018.01)
  *G06F 9/22* (2006.01)
  *G06F 9/28* (2006.01)
  *G06F 8/41* (2018.01)

(52) U.S. Cl.
  CPC ...... *G06F 9/30043* (2013.01); *G06F 9/30174* (2013.01); *G06F 9/30181* (2013.01); *G06F 9/30185* (2013.01); *G06F 15/7867* (2013.01); *G06F 15/7892* (2013.01); *G06F 8/41* (2013.01); *G06F 9/28* (2013.01)

(56) References Cited

U.S. PATENT DOCUMENTS

| | | | |
|---|---|---|---|
| 5,821,773 A * | 10/1998 | Norman | H03K 19/17728 326/39 |
| 6,023,564 A * | 2/2000 | Trimberger | G06F 9/30181 703/23 |
| 6,076,152 A * | 6/2000 | Huppenthal | G06F 15/7867 712/15 |
| 6,138,229 A | 10/2000 | Kucukcakar et al. | |
| 6,191,610 B1 * | 2/2001 | Wittig | H03K 19/1737 326/38 |
| 6,308,311 B1 * | 10/2001 | Carmichael | G06F 15/7867 716/117 |
| 6,415,377 B1 | 7/2002 | Van Der Wolf et al. | |
| 6,453,407 B1 | 9/2002 | Lavi et al. | |
| 7,079,147 B2 | 7/2006 | Wichman et al. | |
| 7,155,560 B2 * | 12/2006 | McGrew | H04W 8/245 711/103 |
| 7,873,814 B1 | 1/2011 | Cohen et al. | |
| 8,473,724 B1 | 6/2013 | Kenville et al. | |
| 2003/0079089 A1 | 4/2003 | Barrick et al. | |
| 2003/0208723 A1 | 11/2003 | Killian et al. | |
| 2004/0085955 A1 * | 5/2004 | Walter | H04L 63/0428 370/386 |
| 2004/0268007 A1 | 12/2004 | Nguyen et al. | |
| 2005/0081014 A1 | 4/2005 | Tran et al. | |
| 2005/0084076 A1 * | 4/2005 | Dhir | H04L 12/5692 379/55.1 |
| 2005/0257186 A1 * | 11/2005 | Zilbershlag | G06F 17/5054 716/102 |
| 2007/0101105 A1 | 5/2007 | Diefendorff | |
| 2007/0288765 A1 * | 12/2007 | Kean | G06F 21/76 713/193 |
| 2009/0167351 A1 | 7/2009 | Agarwal et al. | |
| 2010/0205404 A1 | 8/2010 | Henry et al. | |
| 2012/0260042 A1 | 10/2012 | Henry et al. | |
| 2013/0254485 A1 | 9/2013 | Kannan et al. | |
| 2014/0181415 A1 | 6/2014 | Loh et al. | |
| 2015/0106596 A1 | 4/2015 | Vorbach et al. | |
| 2015/0371063 A1 * | 12/2015 | Van Antwerpen | G06F 21/80 713/190 |
| 2017/0161036 A1 | 6/2017 | Henry et al. | |
| 2017/0161037 A1 | 6/2017 | Henry et al. | |
| 2017/0161067 A1 | 6/2017 | Henry et al. | |
| 2017/0161195 A1 | 6/2017 | Henry et al. | |
| 2017/0161196 A1 | 6/2017 | Henry et al. | |
| 2018/0032657 A1 * | 2/2018 | Matsumura | G06F 15/7867 |

OTHER PUBLICATIONS

Barat, Francisco. et al. "Reconfigurable Instruction Set Processors; a Survey." IEEE International Workshop on Rapid System Prototyping. Jun. 21, 2000. pp. 168-173.

Bertels, Koen et al. "The MOLEN Polymorphic Processor." IEEE Transactions on Computers. vol. 53, No. 11, Nov. 2004. pp. 1363-1375.

Barat, Francisco et al. "Reconfigurable Instruction Set Processors from a Hardware/Software Perspective." *IEEE Transations on Software Engineering*. vol. 27, No. 9, Sep. 2002. pp. 847-862.

Grad, Mariusz et al. "Just-in-Time Instruction Set Extension—Feasibility and Limitations for an FPGA-Based Reconfigurable ASIP Architecture." Paralel and Distributed Processing Workshops and PHD Forum (IPDPSE). 2011 IEEE International Symposium on IEEE. May 16, 2011. pp. 278-285. XP03194781.

* cited by examiner

PROCESSOR WITH MEMORY CONTROLLER INCLUDING DYNAMICALLY PROGRAMMABLE FUNCTIONAL UNIT

CROSS REFERENCE TO RELATED APPLICATION(S)

This application is a continuation-in-part of the following U.S. patent application which is hereby incorporated by reference in its entirety for all intents and purposes.

| SER. NO. | FILING DATE | TITLE |
| --- | --- | --- |
| 15/337,140 | Oct. 28, 2016 | PROCESSOR WITH AN EXPANDABLE INSTRUCTION SET ARCHITECTURE FOR DYNAMICALLY CONFIGURING EXECUTION RESOURCES |

This application is related to the following U.S. patent application which is hereby incorporated by reference in its entirety for all intents and purposes.

| SER. NO. | FILING DATE | TITLE |
| --- | --- | --- |
| 15/337,169 | Oct. 28, 2016 | PROCESSOR WITH PROGRAMMABLE PREFETCHER |

BACKGROUND OF THE INVENTION

Field of the Invention

The present invention relates in general to programmable resources of a processor, and more particularly to a processor with a dynamically programmable functional unit at the memory controller level.

Description of the Related Art

Processors continue to become more powerful with greater performance at higher efficiency levels. The term "processor" as used herein refers to any type of processing unit, including a microprocessor, a central processing unit (CPU), one or more processing cores, a microcontroller, etc. The term "processor" as used herein also includes any type of processor configuration, such as processing units integrated on a chip or integrated circuit (IC) including those incorporated within a system on a chip (SOC) or the like. Semiconductor manufacturing techniques are continually being improved to increase speed, reduce power consumption and reduce the size of circuitry integrated on a processing chip. The reduction of integration size allows additional functionality to be incorporated within the processing unit. Once a conventional processor is manufactured, however, many of its internal functions and operations are essentially fixed.

A memory controller provides an interface between the processor and external system memory, typically configured as dynamic random access memory (DRAM). Although the memory controller may be provided separately, in many modern conventional processing configurations, the memory controller may be integrated onto the same chip or IC as the processor with in input/output (I/O) interface to the external system memory. In conventional configurations, the functions of the memory controller are essentially fixed once the processor is manufactured.

SUMMARY OF THE INVENTION

A processor according to one embodiment includes a memory controller for interfacing an external memory and a programmable functional unit (PFU). The PFU is programmed by a PFU program to modify operation of the memory controller, in which the PFU includes programmable logic elements and programmable interconnectors. For example, the PFU is programmed by the PFU program to add a function or otherwise to modify an existing function of the memory controller to enhance its functionality during operation of the processor. In this manner, the functionality and/or operation of the memory controller is not fixed once the processor is manufactured, but instead the memory controller may be modified after manufacture to improve efficiency and/or enhance performance of the processor, such as when executing a corresponding process.

The processor may include a local memory for storing the PFU program. The local memory may be a random-access memory (RAM) that stores the PFU program retrieved from the external memory. The processor may be responsive to a write command that commands the processor to write the PFU program from the external memory into the random-access memory. The processor may further include a PFU programmer that programs the PFU using the PFU program stored in the PFU memory. The PFU memory may be or otherwise may include a read only memory (ROM) that stores at least one predetermined PFU program for programming the PFU to operate according to a predetermined PFU definition. For example, the PFU program may be a default PFU program, in which the PFU programmer uses the default PFU program to program the PFU upon startup of the processor. The processor may instead, or in addition, be responsive to a program command which causes the PFU programmer to program the PFU with a specified one of multiple PFU programs stored in the PFU memory. A configuration map may be included that maps each of multiple different processing modes with a corresponding one of multiple PFU programs stored in the PFU memory.

The programmable logic elements and the programmable interconnectors may be subdivided into substantially identical programmable sections. A PFU programmer may be included that allocates a number of the programmable sections and that programs the allocated programmable sections with the PFU program to program the PFU.

The programmable logic elements may include programmable lookup tables. In addition or in the alternative, the programmable logic elements may include adders, multiplexers, and registers. The PFU may include a programmable memory in which the PFU program may be a bitstream that is scanned into the programmable memory of the PFU. The PFU may be programmed with multiple PFU programs, and a PFU programmer may be included that enables at least one of the PFU programs at a time during operation of the processor.

As a more specific and non-limiting example, the PFU program may programs the PFU to perform encryption functions for encrypting data stored in the external memory. The encryption functions may include an encryption function and a reverse encryption function that employs a predetermined key that is combined with an address to develop a pad value that is further combined with a data value.

A method of providing a programmable memory controller of a processor that interfaces the processor with an external memory includes incorporating a programmable functional unit (PFU) including programmable logic elements and programmable interconnectors into the memory controller, and programming the PFU with a PFU program to modify operation of the memory controller.

The method may include storing the PFU program in a local memory of the processor. The method may include executing, by the processor, a write command that commands the processor to write the PFU program from the external memory into a random-access memory (RAM) of the local memory. The method may include providing a PFU programmer and a PFU engine within the PFU in which the PFU programmer programs the PFU engine with the PFU program stored in the local memory. The method may include executing, by the processor, a program command that commands the PFU programmer to program the PFU engine with the PFU program stored in the PFU memory. The method may include providing a configuration map in the PFU that maps each of multiple different processing modes with a corresponding one of multiple PFU programs stored in the PFU memory.

The method may include subdividing the programmable logic elements and the programmable interconnectors into substantially identical programmable sections, allocating a number of the programmable sections to configure the PFU according to the PFU program, and programming the allocated number of the programmable sections with at least one PFU program. The method may include providing the PFU as a programmable memory, and scanning at least one PFU program as a bitstream into the programmable memory of the PFU engine. The method may include programming the PFU with multiple PFU programs, and enabling at least one of PFU programs at a time during operation of the processor.

BRIEF DESCRIPTION OF THE DRAWINGS

The benefits, features, and advantages of the present invention will become better understood with regard to the following description, and accompanying drawings where.

DETAILED DESCRIPTION

The inventors have recognized possible limitations associated with predetermined memory controllers that exist in conventional processors. They have therefore developed a processor with a memory controller incorporating a programmable functional unit (PFU) that is configurable or otherwise programmable to modify or otherwise enhance operation of the memory controller. The basic input/output system (BIOS) or the operating system (OS) may include configuration information used to program the PFU. The BIOS, upon power-on, reset, or restart or the like (referred to herein as POR), or the OS (when loaded during startup after BIOS) may copy the configuration information into memory and send a command to the PFU to access the configuration information. In addition or in the alternative, a programmer or developer of a particular software program, process, or application may incorporate a PFU program into the application for programming the PFU to modify or enhance operation of the memory controller for use by that particular application. As an example, the PFU may be configured to perform programmed encryption functions when writing to or reading from the external system memory used by the processor.

Figure 1:
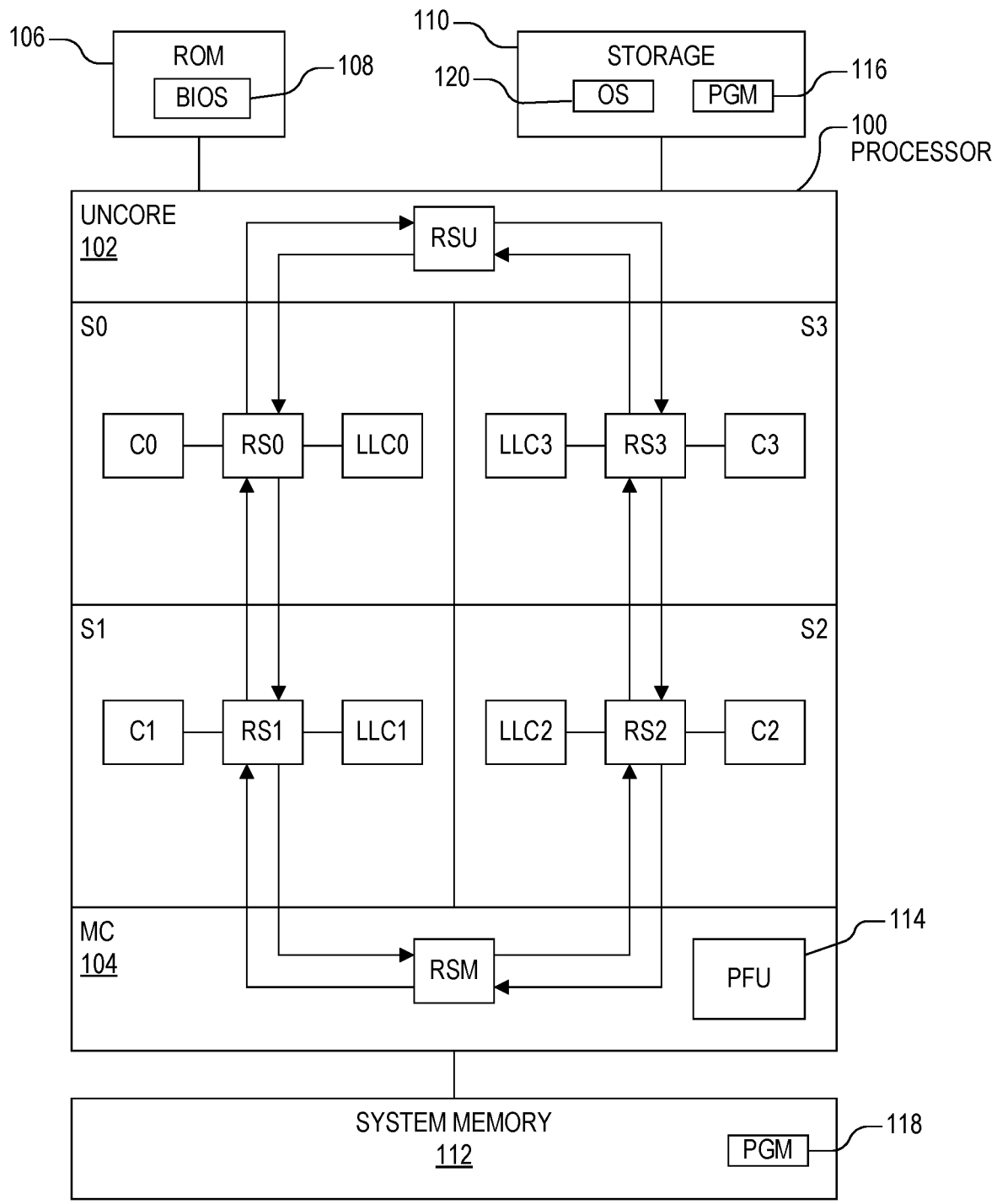
FIG. 1 is a simplified block diagram of a processor incorporating a programmable functional unit (PFU) implemented according to one embodiment of the present invention coupled to external storage and memory devices.

FIG. 1 is a simplified block diagram of a processor 100 incorporating a programmable functional unit (PFU) 114 implemented according to one embodiment of the present invention coupled to external storage and memory devices. The standard instruction set architecture (ISA) of the processor 100 may be an x86 architecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention, however, is not limited to x86 architectures so that the processor 100 may be implemented according to any alternative ISA as known by those of ordinary skill in the art.

The processor 100 includes 4 slices individually labeled S0, S1, S2, and S3 (S0-S3), in which it is understood that the number of slices is arbitrary and includes only one (1) and up to any positive integer. Each of the slices S0-S3 includes a corresponding one of 4 cores C0, C1, C2, and C3 (C0-C3), a corresponding one of 4 cache memories or "last level caches" LLC0, LLC1, LLC2, and LLC3 (LLC0-LLC3), and a corresponding one of 4 ring stops R0, R1, R2, and R3 (R0-R3). Each of the cores C0-C3 includes one or more internal cache memories (e.g., one or more L1 caches and an L2 cache or the like, not shown) coupled to a corresponding one of the ring stops R0-R3, which is further coupled to a corresponding one of the last level caches LLC0-LLC3. It is appreciated that the processor 100 may be configured as a single core processor, central processing unit (CPU), or microprocessor rather than multiple slices with multiple cores.

The processor 100 further includes an "uncore" 102 with a corresponding ring stop RSU and a memory controller (MC) 104 with a corresponding ring stop RSM. The ring stops R0-R3, RSU, and RSM are coupled together in a ring configuration for enabling communication between the slices S0-S3, the uncore 102, and the memory controller 104. As shown, for example, RS0 bi-directionally communicates with RS1, which bi-directionally communicates with RSM, which bi-directionally communicates with RS2, which bi-directionally communicates with RS3, which bi-directionally communicates with RSU, which bi-directionally communicates with RS0. Given the ring and bidirectional communications, the particular ordering of the ring stops in the ring configuration is arbitrary in which the illustrated configuration is only one of many possible alternative configurations.

The uncore 102 incorporates or otherwise interfaces functions of the processor 100 that are not located in any of the slices S0-S3 or corresponding cores C0-C3, but which otherwise should be closely connected to the cores to achieve desired performance level. In the illustrated configuration, for example, the uncore 102 is provided to interface an external read-only memory (ROM) 106, which typically incorporates the basic input/output system (BIOS) 108. The BIOS 108 is firmware executed upon POR of the processor 100, which is used to perform hardware initialization during POR to provide runtime services for an operating system (OS) 120 and programs or applications. The uncore 102 is also provided to interface external storage 110, which may include any number of data storage devices, such as one or more hard disk drives, optical disk drives, flash drives, etc., and which typically stores the OS 120.

The MC 104 interfaces the processor 100 to an external system memory 112. The slices S0-S3 share the resources of the system memory 112, and may also share information with each other via the ring stops RS0-RS3, RSU, RSM. The system memory 112 may be implemented using suitable memory devices or chips, such as one or more dynamic random access memory (DRAM) chips or the like.

The MC 104 further includes the PFU 114, which may be programmed to modify or otherwise enhance the functionality of the MC 104. The PFU 114 may be programmed in any one of several ways depending upon the particulars of the configuration. In one case, the BIOS 108, after initializing the storage 110 and the system memory 112, accesses a PFU program (PGM) 116 stored in the storage 110, and copies the PFU program 116 to a memory on the processor 100 or to the system memory 112. For example, a copy of the PFU program 116 is shown as PFU program 118 stored in the system memory 112 after being copied. In one embodiment the PFU program 116 may be stored in an encrypted and/or compressed format, in which the PFU program 116 may first be decrypted and/or uncompressed when storing in a memory on the processor 100 or in the system memory 112. As described further herein, however, the PFU program 116 may have the form of a bitstream comprising a series of logic ones (1s) and zeros (0s) that need not be decrypted or compressed. The BIOS 108 then sends a command or instruction or the like to the PFU 114 to locate and to program itself with the copied PFU program 118. Once programmed, the PFU 114 is enabled to modify or enhance operation of the MC 104 during operation of the processor 100.

In another case, after execution of the BIOS 108, the OS 120 is loaded into and installed on the processor 100, and during OS installation, the OS 120 performs essentially the same procedure by copying the PFU program 116 and then instructing the PFU 114 to locate and to program itself with the PFU program, such as the PFU program 118. In yet another case, a program or application or the like performs a similar process, in which the application incorporates the PFU program 116, and the application instructs the PFU 114 to locate and program itself using the copied PGM information, such as the PFU program 118. In another embodiment, the PFU 114 incorporates a local memory (e.g., local memory 206, FIG. 2) for storing the PFU program 118. In this case, the BIOS 108, the OS 120, or an application performs a similar programming process, except that the PFU program 118 is stored in the local memory 206 of the PFU 114, and the PFU 114 accesses the PFU program 118 from its local memory for programming.

Figure 2:
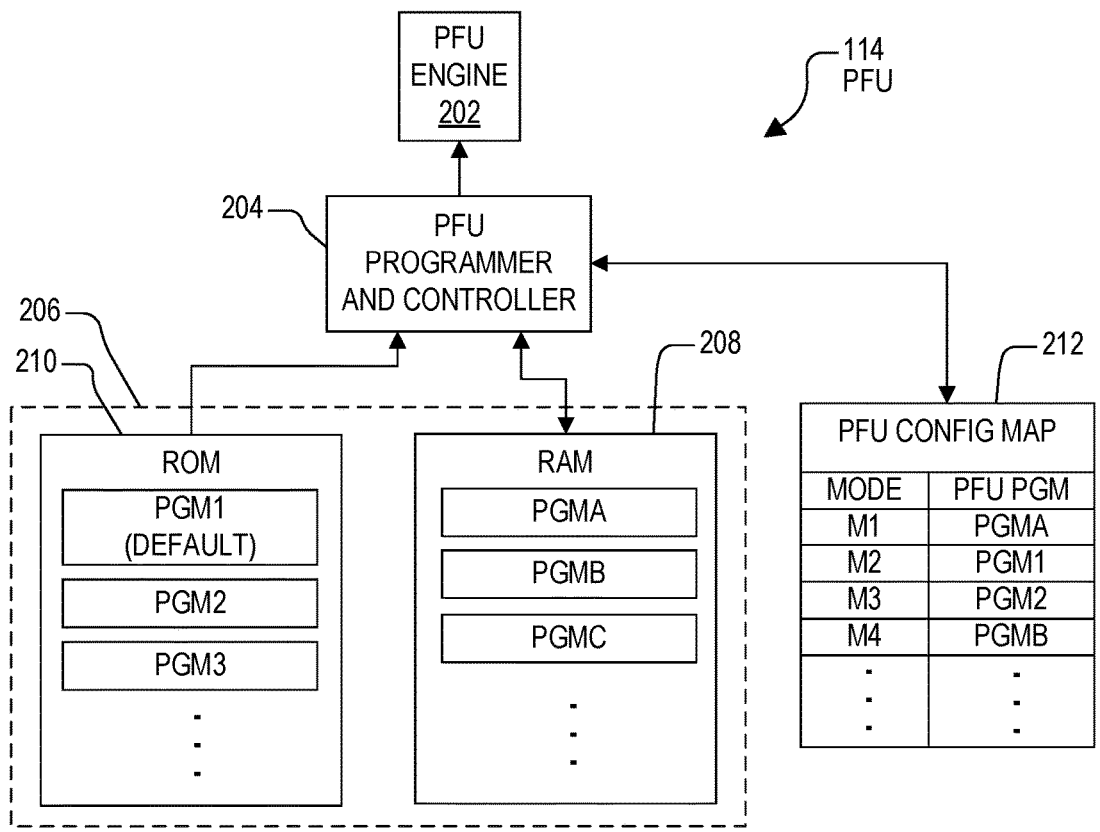
FIG. 2 is a more detailed block diagram of the PFU of FIG. 1 implemented according to one embodiment of the present invention.

FIG. 2 is a more detailed block diagram of the PFU 114 implemented according to one embodiment of the present invention. A PFU engine 202 is provided which is programmed with the PFU program 118 for modifying and/or enhancing operation of the MC 104. A PFU programmer and controller 204 may be included in the PFU 114 which is used to manage and/or control operation of the PFU engine 202 including programming the PFU engine 202. The PFU programmer and controller 204 accesses one or more identified PFU programs for programming the PFU engine 202, and enables at least one of the one or more PFU programs programmed into the PFU engine 202. The PFU programmer and controller 204 is shown as a separate unit, but may be incorporated within the PFU engine 202 itself. In one embodiment, the PFU 114 does not include the local memory 206 in which case the system memory 112 may be used to store the PFU program 118. In the case without the local memory 206, the BIOS 108, the OS 120, or an application sends a programming command identifying a location of the PFU program 118 in the system memory 112, and the PFU programmer and controller 204 accesses the PFU program 118 from the system memory 112 and programs the PFU engine 202.

In one embodiment, the PFU engine 202 may be configured with sufficient resources to be programmed with multiple PFU programs, in which the PFU programmer and controller 204 programs each one into the PFU engine 202 and simply activates or enables the appropriate PFU program associated with the particular process executing or the particular operating mode of the processor 100. As an example, the PFU engine 202 may initially be programmed upon POR and enabled for most operations of the processor 100. A process (e.g., program or application or the like) may program the PFU engine 202 with another PFU program for use when the process is active and executing. The PFU programmer and controller 204 manages operation of the PFU engine 202 by activating only one of the PFU programs programmed into the PFU engine 202 at a time. In configurations without a local memory, the PFU engine 202 may be programmed with a limited number of PFU programs.

It is appreciated that the PFU engine 202 may be a limited resource in which a limited number of PFU programs may be loaded at any given time. The PFU engine 202 may not have sufficient capacity to be programmed with the total number of PFU programs that may be activated at any given time during operation of the processor 100. In such a configuration it may be difficult to switch programming of the PFU engine 202 with different PFU programs for different modes over time, particularly when the location information for one or more of the PFU programs in the system memory 112 may no longer be valid or unavailable. Also, the PFU engine 202 may include sufficient resources to be programmed with only one large or two smaller PFU programs depending upon its implementation.

In another embodiment, the PFU 114 incorporates the local memory 206 for storing at least one PFU program used to program the PFU engine 202. The local memory 206 may include a random access memory (RAM) 208, in which case the PFU program 116 may be copied to the RAM 208 and accessed by the PFU programmer and controller 204 to program the PFU engine 202. In one embodiment, the RAM 208 may have a sufficient size to store multiple PFU programs, shown as PGMA, PGMB, PGMC, etc. In response to a program command, the PFU programmer and controller 204 accesses an identified one of the PFU programs for programming the PFU engine 202. In this manner, if the PFU engine 202 does not have sufficient resources to hold all of the PFU programs that could be activated at any time, then the PFU programmer and controller 204 may re-program the PFU engine 202 on the fly from the local memory 206 in response to a command or in response to a mode change.

The local memory 206 may also include a read-only memory (ROM) 210 for storing one or more standard or predetermined PFU programs, shown as PGM1, PGM2, PGM3, etc. In one embodiment, one of the predetermined PFU programs may be designated as a default PFU program (e.g., PGM1). During initial startup of the processor 100, instead of (or in addition to) copying the PFU program 116 from the storage 110, the BIOS 108 or the OS 120 instructs the PFU programmer and controller 204 to program the PFU engine 202 with the default PFU program, if included, and then activates the default PFU program of the PFU engine 202. In the alternative, or in addition, the BIOS 108, the OS 120, or any application or process may identify any of the predetermined PFU programs stored within the ROM 210 for programming the PFU engine 202.

In order to facilitate multiple PFU programs, a PFU configuration map 212 may be provided that maps a particular operating mode of the processor 100 with a corresponding PFU program provided for that mode. The operating mode may include process identification information in the event a particular process employs a corresponding PFU program. As shown, for example, several modes are identified as M1, M2, M3, M4, etc., associated with corresponding PFU programs PGMA, PGM1, PGM2, PGMB, etc., respectively. The PFU programmer and controller 204 updates the PFU configuration map 212 each time a PFU program is programmed into the PFU engine 202. The PFU programmer and controller 204 identifies the active mode (or process) at any given time and activates the corresponding PFU program programmed within the PFU engine 202, or otherwise programs the PFU engine 202, according to the mapping provided in the PFU configuration map 212. Once the correct PFU program is loaded and/or activated, operation of the MC 104 is modified or enhanced accordingly by the PFU engine 202.

In this manner, the PFU programmer and controller 204 may map each mode (or process) with the corresponding PFU program unless and until superseded by another. In response to each subsequent programming command or mode change, the PFU programmer and controller 204 activates or otherwise programs the PFU engine 202 with the identified predetermined PFU program, either from the ROM 210 or the RAM 208, and then updates the PFU configuration map 212 accordingly. In particular, the PFU programmer and controller 204 consults the PFU configuration map 212 and determines whether the PFU program associated with the corresponding mode is already loaded within the PFU engine 202. If so, then the PFU programmer and controller 204 deactivates the current PFU program, if any, and activates the next PFU program in the PFU engine 202 for the mode being activated. If the PFU engine 202 is not loaded with the appropriate PFU program for the new mode, then the PFU programmer and controller 204 accesses either the RAM 208 or the ROM 210 that stores the identified PFU program and programs the PPF engine 202 accordingly.

In one embodiment, the PFU programmer and controller 204 identifies whether the PFU engine 202 has sufficient available space to program the next PFU program without overwriting any PFU programs currently loaded within the PPF engine 202. If so, then the next PFU program is loaded into the available space. If, however, the PFU engine 202 does not have sufficient available space to load the next PFU program, then the PFU programmer and controller 204 uses a replacement policy to overwrite one or more PFU programs currently residing within the PFU engine 202. The replacement policy may be a least-recently used (LRU) algorithm or the like, but may also take into consideration the amount of programmable space needed for the PFU program being loaded. For example, if a smaller least recently used PFU program would not otherwise provide sufficient space for the next PFU program to be loaded, then a larger PFU program may be selected and overwritten even if more recently used. In one embodiment, if a copy of any PFU program being overwritten within the PFU engine 202 is not stored within the ROM 210 or the RAM 208, and if the RAM 208 has sufficient available storage, then the PFU programmer and controller 204 may unload or copy the PFU program from the PFU engine 202 into the RAM 208 before it is overwritten in the PFU engine 202.

Although the RAM 208 may store an appreciable number of PFU programs, in the event that the RAM 208 is not large enough to store all of the PFU programs that are attempted to be loaded at any given time, then the PFU programmer and controller 204 may take appropriate action. For example, if a process attempts to configure a PFU program that is not found or otherwise not available, then the PFU programmer and controller 204 may simply disable the operation of the PFU engine 202 for that process. Alternatively, the PFU programmer and controller 204 may load or otherwise activate a standard PFU program, such as the default PFU program PGM1, as long as any other PFU program is not permanently overwritten.

Figure 3:
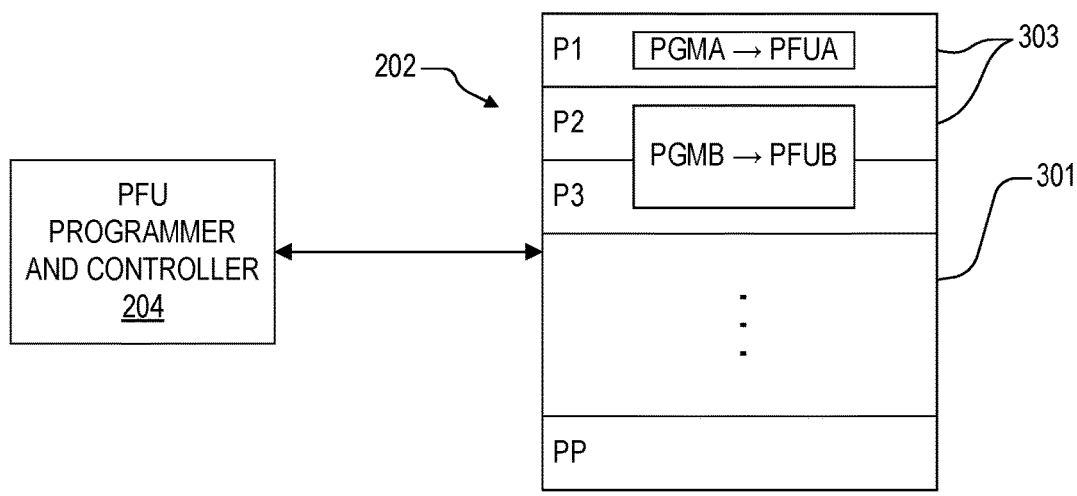
FIG. 3 is a is a simplified block diagram of the PFU programmer and controller interfaced with the PFU engine of FIG. 2, which is implemented according to one embodiment of the present invention using programmable logic.

FIG. 3 is a is a simplified block diagram of the PFU programmer and controller 204 interfaced with the PFU engine 202, which is implemented according to one embodiment of the present invention using programmable logic 301. In the illustrated embodiment, the programmable logic 301 is subdivided into a set of "P" substantially identical programmable sections 303, individually shown as programmable sections P1, P2, . . . , PP, in which "P" is a positive integer. The PFU programmer and controller 204 programs one or more PFU programs into the programmable logic 301. In particular, the PFU programmer and controller 204 allocates one or more of the programmable sections 303 sufficient to program a PFU program, and then loads the PFU program into the allocated section(s) 303 to implement a corresponding PFU function within the PFU engine 202. The PFU programmer and controller 204 keeps a pointer or the like to identify and locate each PFU program loaded into the PFU engine 202, and activates or deactivates loaded PFU programs based on the operating mode or active process.

The programmable logic 301 may be a relatively large resource, such as implemented by a field programmable gate array (FPGA) or the like, to program multiple PFU programs at a time for each of multiple application processes. Nonetheless, the programmable logic 301 is a limited resource in that remaining un-allocated sections 303 may be insufficient to program a new PFU program to be programmed. In such event, the PFU programmer and controller 204 may copy an existing PFU program from the programmable logic 301 into the RAM 208 if a copy does not already exist in the RAM 208 and if sufficient space is available therein, and then may program allocated sections 303 with the new PFU program. When a process has completed operation such that it is terminated, or in the event of a mode switch, any PFU programs that have been programmed for that process may be invalidated and eventually overwritten within the PFU engine 202 and/or the RAM 208.

Each programmable section 303 may include sufficient programmable logic to perform a simple PFU program. As shown, for example, a first PFU program PGMA (relatively simple) is loaded into a first programmable section P1 to implement a first program PFUA, and a second PFU program PGMB (more complex) is loaded into two programmable sections P2 and P3 to implement a second program PFUB. In addition, even more complicated PFU programs may be loaded into more than two of the sections 303. Any number of PFU programs may be programmed into the programmable logic 301 depending upon the relative size and complexity of the PFU programs and the total number of programmable sections 303.

In one embodiment, the PFU programmer and controller 204 performs dynamic allocation in which it identifies the next section 303 available for allocation and begins programming as it scans a new PFU program. If the PFU program continues after a first allocated section 303 has been completely programmed such that additional sections 303 are needed to complete the programming, additional sections are dynamically allocated on the fly until the PFU program is completely programmed into the PFU engine 202. In one alternative embodiment, the PFU programmer and controller 204 first evaluates the size of the new PFU program and allocates the appropriate number of programmable sections 303 accordingly prior to programming. In another alternative embodiment, the PFU program may be configured to include a resource statement (RSRC) 903 or the like (FIG. 9) that indicates the number of sections 303 (or at least the number and type of programmable elements) that are needed for the PFU program. In this case, the PFU programmer and controller 204 retrieves the resource statement 903, pre-allocates the indicated number of sections 303, and then programs the allocated sections using the PFU program.

Once a PFU program is programmed into the programmable logic 301 for a given process and the PFU configuration map 212 is updated accordingly, the PFU programmer and controller 204 monitors or is otherwise provided mode information and enables the corresponding PFU program to operate during that mode.

Figure 4:
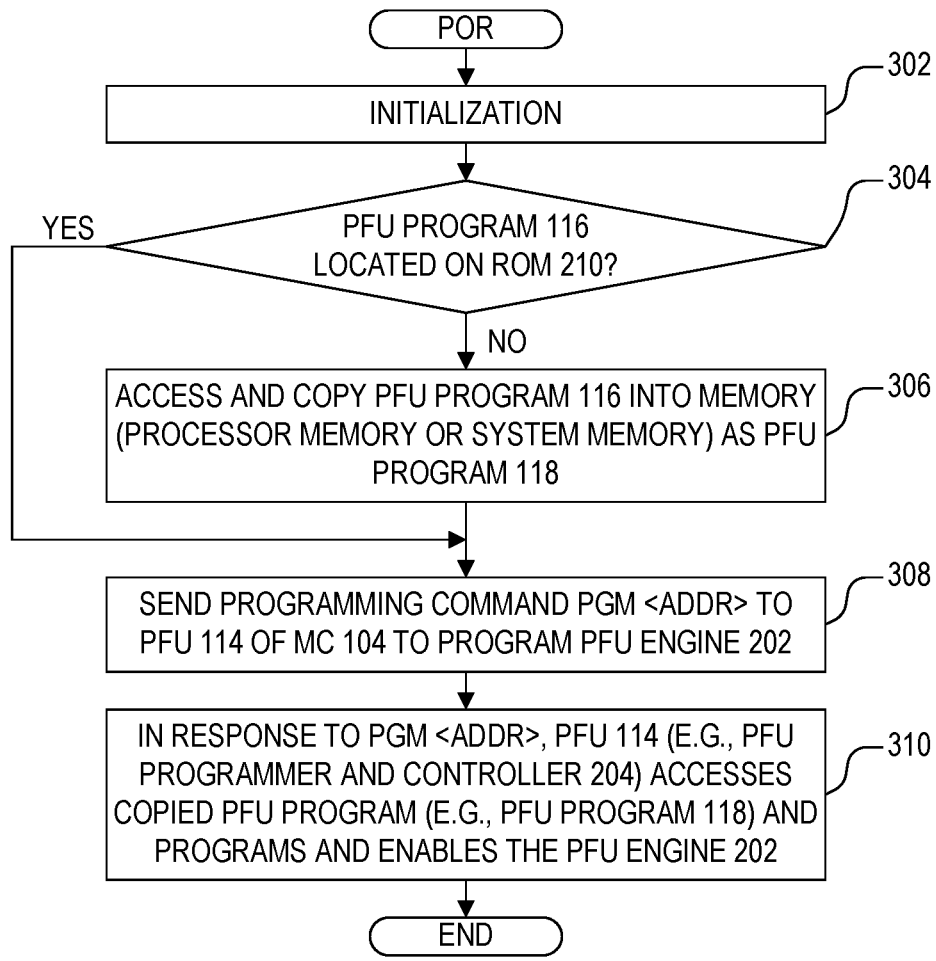
FIG. 4 is a block diagram illustrating a method of initially programming the PFU of FIG. 1 according to one embodiment of the present invention.

FIG. 4 is a block diagram illustrating a method of initially programming the PFU 114 according to one embodiment of the present invention. Upon POR, the BIOS 108 performs initialization processes and routines for performing hardware initialization to provide runtime services for the OS 120 and programs or applications at block 302. Initialization includes, for example, initialization of the storage 110 and the system memory 112 for use by the processor 100.

The next set of blocks 304, 306 and 308 may be performed by the BIOS 108 or the OS 120 depending upon the implementation. At next block 304, it is determined whether the PFU program 116 is located on the ROM 210 of the PFU 114 if the ROM 210 is provided. For example, the PFU program may be stored as PGM1 (e.g., default PFU program or the like) on the ROM 210 if provided. If the PFU program 116 is not located on the ROM 210 or the ROM 210 is not provided, operation proceeds to block 306 in which the PFU program 116 is accessed on the storage 110 and copied to either the RAM 208 of the local memory 206, if provided, or to the system memory 112.

After either block 304 or 306, operation proceeds to block 308 in which a programming command PGM <ADDR> is sent to the PFU 114 of the MC 114 to program the PFU engine 202. The PGM command may be received by the PFU programmer and controller 204, which uses the included address ADDR to locate the PFU program 118. In the embodiment in which the PFU program 118 is pre-stored within the processor 100 on the ROM 210, the ADDR identifies the location within the ROM 210, such as, for example, the location of PGM1 (or any other pre-stored PFU program within the ROM 210). In the embodiment in which the PFU program 118 is not pre-stored but the RANI 208 of the local memory 206 is provided on the processor 100, then the PFU program 116 may be copied to a location within the RAM 208 in which ADDR identifies the location of the copied PFU program. For example, ADDR may identify the location of the copied the PFU program 118 stored as PGMA or the like on the RAM 208. In the event that the local memory 206 is not provided, then the PFU program 116 is copied as the PFU program 118 stored in the system memory 112, and ADDR identifies the location of the PFU program 118 in the system memory 112.

Operation then proceeds to block 310, in which the PFU programmer and controller 204 accesses the PFU program (e.g., PFU program 118, and/or PGM1, and/or PGMA) using the provided ADDR, and programs and enables the PFU engine 202 accordingly. The method of initial programming is then completed. Once the programmed PFU engine 202 is programmed and enabled in this manner, it modifies and/or enhances operation of the MC 104 according to the PFU program.

Figure 5:
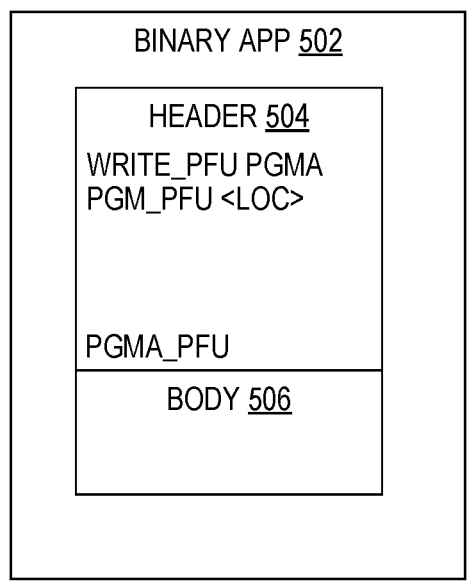
FIG. 5 is a simplified block diagram depicting an executable binary application according to one embodiment of the present invention that may be used to program or otherwise re-program the PFU of FIG. 1.

FIG. 5 is a simplified block diagram depicting an executable binary application (APP) 502 according to one embodiment of the present invention that may be used to program or otherwise re-program the PFU 114. The binary APP 502 includes a header 504 and a main body 506. The binary APP 502 is shown in generic form and may be implemented as a binary executable (.EXE) file, a bytecode file (.NET, Java, etc.), or any other type of executable code that may be successfully executed by any one or more of the processing cores C0-C3 of the processor 100. In the illustrated configuration, the header 504 includes at least one PFU write instruction, in which each write instruction is provided for specifying or locating a corresponding PFU program that may be used to program the PFU 114. As shown, for example, the header 504 includes a PFU write instruction WRITE_PFU that includes an operand (or argument)

PGMA that identifies a corresponding PFU program PGMA_PFU incorporated within the header 504. Alternatively, the PFU program PGMA_PFU may be provided within a different section of the binary APP 502. In any case, the operand PGMA may be an address or offset used to locate the PFU program PGMA_PFU within the binary APP 502 and/or system memory 112. Although the binary APP 502 includes only one PFU write instruction that identifies a corresponding PFU program, an executable binary application may include any number of PFU write instructions for loading any number of PFU programs that may be loaded into the processor 100 at any given time.

During operation, a processing core (e.g., C0) accesses and/or loads the binary APP 502 from the storage 110 to the system memory 112 and executes the WRITE_PFU instruction. Assuming that the RAM 208 of the local memory 206 exists, the operand PGMA of the WRITE_PFU instruction is used to locate the PFU program PGMA_PFU within the binary APP 502, and to write the PFU program PGMA_PFU into the RAM 208. Alternatively, the PFU program PGMA_PFU may be written into any other memory accessible by the PFU 114 of the processor 100. The header 121 further includes a PFU programming instruction PGM_PFU with a location (or address) operand LOC, which is forwarded to the PFU programmer and controller 204 of the PFU 114. LOC identifies the location within the RAM 208 of the PFU program PGMA_PFU that was copied from the binary APP 502. The PFU programmer and controller 204 then programs the PFU engine 202 with the PFU program PGMA_PFU from the RAM 208.

In a configuration in which the local memory 206 (or any other suitable memory) is not provided within the processor 100, the WRITE_PFU instruction may simply identify the location of the PFU program PGMA_PFU within the binary APP 502 without actually copying it into any local memory of the processor 100. In this case, LOC is updated with the address within the system memory 112 of the PFU program PGMA_PFU. The PFU programming instruction PGM_PFU is forwarded to the PFU programmer and controller 204 of the PFU 114, which uses the operand LOC to locate the PFU program PGMA_PFU in the system memory 112 for programming the PFU engine 202.

In an alternative configuration, a single instruction or command may be used in the binary APP 502, which when executed, is forwarded to the PFU programmer and controller 204. The PFU programmer and controller 204 uses the included operand in the form of an address or offset or the like to locate the PFU program PGMA_PFU, which is used to directly program the PFU engine 202. In any of the programming configurations, the PFU programmer and controller 204 enables the PFU program PGMA_PFU newly programmed into the PFU engine 202.

The system memory 112 (and/or other external memory) may include multiple application programs that are loaded for execution by the processor 100 over time. Multiple applications or processes may be loaded into any one or more of the processing cores C0-C3, although each processing core typically executes only one process at a time in the illustrated embodiment. Embodiments in which each processing core executes multiple processes at a time are contemplated. Multiple application programs may be assigned for execution by one of the processing cores. The OS 120 includes a scheduler or the like that schedules execution of the application programs of the processor 100 including swapping in and out each multiple processes for execution, one at a time, for a given processing core. Multiple applications may be executed by a given processing core, in which each application may include one or more PFU programs for programming the PFU 114. The PFU programmer and controller 204 and the local memory 206 along with the PFU configuration map 212 may be used to manage different processes corresponding to different processing modes of the processor 100 for controlling programming of the PFU engine 202 over time.

Figure 6:
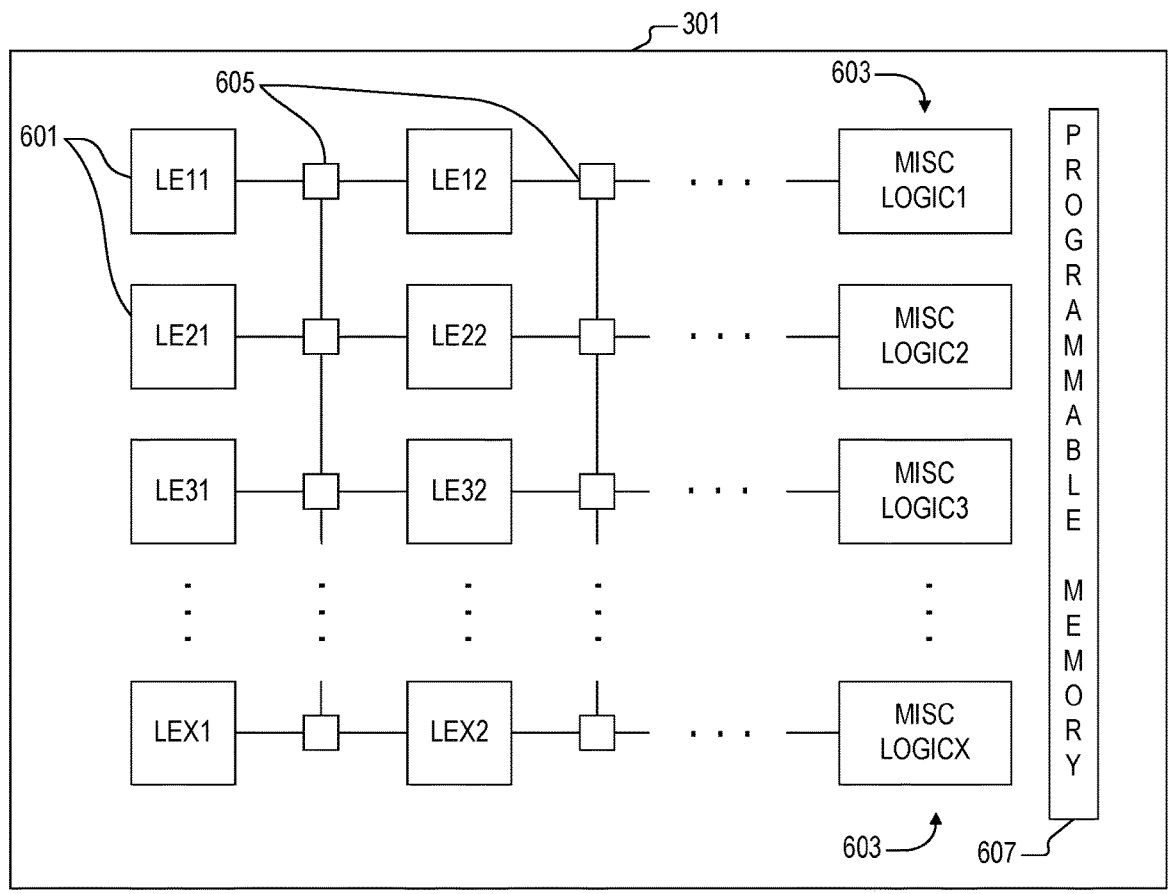
FIG. 6 is a more detailed block diagram of the programmable logic of FIG. 3 implemented according to one embodiment of the present invention.

FIG. 6 is a more detailed block diagram of the programmable logic 301 of FIG. 3 implemented according to one embodiment of the present invention. The illustrated programmable logic 301 includes an array of programmable elements including programmable logic elements (LE) 601 shown arranged in an XY matrix of logic elements 601, individually shown as LExy in which x and y denote row and column indices, respectively, of the array. Each row further includes at least one of an array of miscellaneous logic blocks 603, each including supporting logic to supplement the matrix of logic elements 601. Each miscellaneous logic block 603 may include, for example, one or more storage elements, one or more registers, one or more latches, one or more multiplexers, one or more adders (to add or subtract digital values), a set of Boolean logic elements or gates (e.g., logic gates such as OR gates, AND gates, inverters, exclusive-OR (XOR) gates, etc.), etc. Each miscellaneous logic blocks 603 may include one or more registers configured as shift registers or data swizzlers or the like for flexible data manipulation. The logic elements 601 and the miscellaneous logic blocks 603 are coupled together with a routing mesh that includes a matrix of programmable crossbar switches or interconnectors 605. Each programmable interconnector 605 includes multiple switches to selectively connect the programmable devices together. The routing mesh includes sufficient connectivity to connect multiple ones of the logic elements 601 and miscellaneous logic blocks 603 together to perform simple processing operations and more complicated processing operations.

As further described herein, each programmable section 303 includes one or more programmable elements (logic elements 601, logic blocks 603), and corresponding routing mesh (interconnectors 605) for selectively connecting the devices and elements together to implement a corresponding function of the PFU 114 for modifying operation of the MC 104. The routing mesh is a switching matrix that includes multiple switches and the like for redirecting inputs and outputs between the logic elements 601 and miscellaneous logic blocks 603.

The programmable logic 301 incorporates programmable memory 607 that is used to receive a PFU program (e.g., one or more of PFU program 116, PFU program 118, PGMA, PGMB, PGMC, . . . , PGM1, PGM2, PGM3, etc.) to program selected ones of the logic elements 601, corresponding miscellaneous logic blocks 603, and the programmable interconnectors 605 in such a manner as to create a corresponding PFU function for modifying operation of the MC 104 when activated or otherwise enabled. The programmable memory 607 may also include storage locations or registers or the like to receive input operands or values and to store output results of a PFU program. The programmable memory 607 is distributed among the programmable sections 303 of the programmable logic 301, and may be used by each of the programmable sections 303 individually or collectively among selected allocated sections 303 performing a specific PFU operation. The programmable memory 607 may be configured as private memory space within the programmable logic 301 or even within the MC 104 and not externally accessible. The memory 607 may be implemented in any suitable manner such as static random-access memory (SRAM) or the like.

Figure 7:
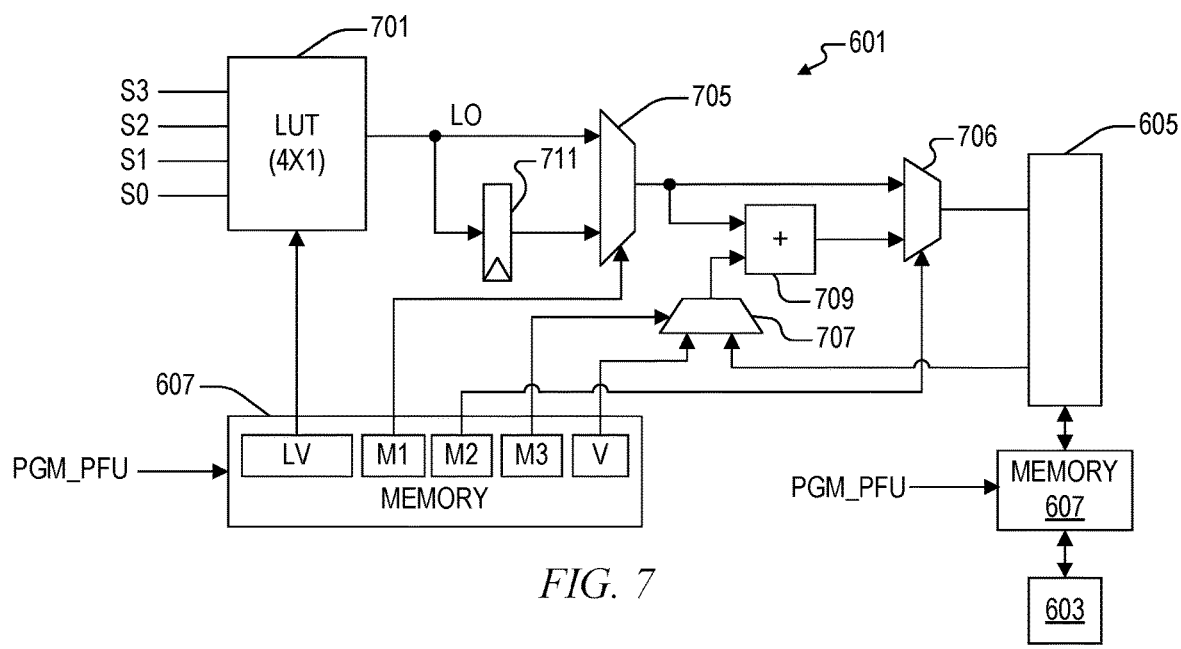
FIG. 7 is a schematic and block diagram of a programmable logic element of FIG. 6 implemented according to one embodiment of the present invention.

FIG. 7 is a schematic and block diagram of a programmable logic element 601 implemented according to one embodiment of the present invention. The logic element 601 includes a look-up table (LUT) 701, three 2-input multiplexers (MUXes) 705, 706 and 707, a 2-input adder 709, and a clocked register (or latch) 711. A portion of the programmable memory 607 is shown that is used to program portions of the logic element 601, any included miscellaneous logic blocks 603, and one or more interconnectors 605. As noted above, the programmable memory 607 may be used to provide input values, to store output results, and/or to store intermediate values that are updated for each of multiple iterations of a processing operation.

As shown, the memory 607 is programmed using a PFU program shown as PGM_PFU. The LUT 701 is illustrated as a 4×1 LUT that is programmed with corresponding LUT value (LV) bits in the memory 607. Each of the MUXes 705, 706 and 707 has a select input controlled by a corresponding memory bit stored in the memory 607, shown as memory bits M1, M2, and M3, respectively. The output of the LUT 701, shown as LO, is provided to one input of the MUX 705 and to an input of the register 711, having its output provided to the other input of the MUX 705. The output of the MUX 705 is provided to one input of the MUX 706 and to one input of the adder 709. The output of the adder 709 is provided to the other input of the MUX 706, having its output provided to an input of the programmable interconnectors 605. The memory 607 includes a programmable bit V that is provided to one input of the MUX 707, having its other input coupled to an output of the programmable interconnectors 605, and having its output provided to the other input of the adder 709. The output of the adder 709 is provided to the other input of the MUX 706. The memory 607 may also be used to program corresponding portions of the interconnectors 605 and any miscellaneous logic blocks 603.

The illustrated logic element 601 is exemplary only and alternative versions are contemplated depending upon the particular configuration. The logic element 601 may be configured on a bit-slice granularity level for handling a single bit of a data value. For data values including multiple bits, multiple bit-slice logic elements are used. For example, for 64-bit data values, 64 bit-slice logic elements are used in parallel.

In operation, the memory 607 is programmed with the LUT data values (LV) of the LUT 701, the select inputs M1-M3 of the MUXes 705-707, and a programmable data value V provided to an input of the MUX 707. Four input values S0-S3 are provided from an operand of the instruction, from the memory 607, or from another programmed block to select one of 16 values programmed into the LUT 701, in which the selected value is provided at its output as LO. The MUX 705 is programmed to directly provide the LO output of the LUT 701 or to provide a registered version thereof. A registered version may be used to insert latency for purposes of timing of the PFU operation. The MUX 706 is programmed to directly provide the output of the MUX 705 or to provide an output of the adder 709 to the interconnector 605 to be provided as an output or to be provided to another programmed block. The adder 709 adds a selected value to the output of the MUX 705, in which the selected value is the programmed value V or is from an output of the interconnector 605 (provided from another input or from another programmed block).

Figures 8, 9:
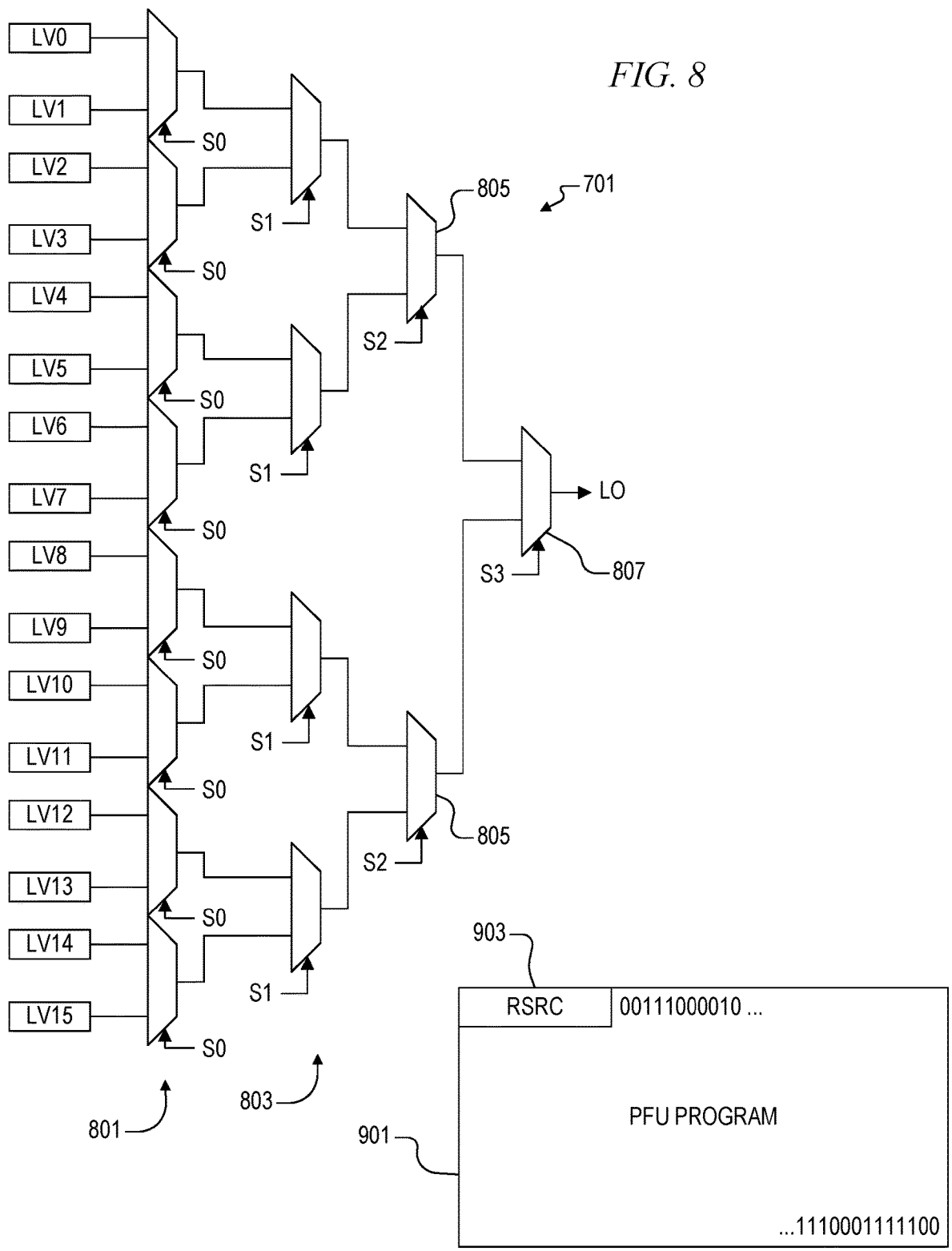
FIG. 8 is a schematic diagram of the LUT of FIG. 7 implemented according to one embodiment of the present invention.
FIG. 9 is a simplified block diagram of a format of a PFU program for programming the PFU engine of FIG. 2 according to one embodiment of the present invention.

FIG. 8 is a schematic diagram of the LUT 701 implemented according to one embodiment of the present invention. A set of 2-input MUXes organized as a binary MUX tree is provided for choosing between 16 input values LV0-LV15 based on the select input S3:S0 (in which S0 is the least significant bit). The LV0-LV15 are programmed into the memory 607 as previously described. Each consecutive pair of the 16 input values LV0-LV15 (LV0&LV1, LV2&LV3, etc.) are provided to corresponding pairs of inputs of eight 2-input MUXes 801 each receiving S0 at its select input. Each consecutive pair of the eight outputs of the MUXes 801 are provided to the corresponding pairs of inputs of four 2-input MUXes 803 each receiving S1 at its select input. Each consecutive pair of the four outputs of the MUXes 803 are provided to the corresponding pairs of inputs of two 2-input MUXes 805, each receiving S2 at its select input. The pair of outputs of the MUXes 805 are provided to the pair of inputs of an output MUX 807 receiving S3 at its select input and providing the LUT output LO at its output. It is appreciated that the configuration shown in FIG. 8 is only one of many suitable LUT implementations as understood by those of ordinary skill in the art.

FIG. 9 is a simplified block diagram of a format of a PFU program 901 for programming the PFU engine 202 according to one embodiment of the present invention, in which the PFU program 901 may represent the form of any of the PFU programs 116, 118, PGMA, PGMB, PGMC, . . . , PGM1, PGM2, PGM3, etc. In this case, the PFU program 901 may include the resource statement (RSRC) 903 that indicates the amount of resources needed within the programmable logic 301 for implementing the PFU program. As an example, the resource statement 903 may indicate the number of programmable sections P needed to complete the programming. The PFU programmer and controller 204 may read the resource statement 903 during programming of the PFU engine 202 to allocate a corresponding number of the programmable sections 303. Although a greater degree of granularity may be used, such as by tracking each logic element 601, miscellaneous logic block 603, programmable interconnector 605 and/or amount of the programmable memory 607, such may require the PFU programmer and controller 204 to track each of the individual elements of the programmable logic 301 over time.

The PFU program 901 may further include a series of logic ones (1s) and zeros (0s) otherwise referred to as a bitstream. In one embodiment, for example, in response to a programming instruction received by a processing core, the PFU programmer and controller 204 aligns the programmable memory (including the programmable memory 607 and corresponding programmable memory of the interconnectors 605) of allocated ones of the programmable sections 303 into a large serialized shift register, then shifts in the bitstream until fully loaded within each of the allocated sections, then de-aligns the programmable memory and provides a pointer to locate or identify the programmed PFU. Alternative programming methods and formats may be used including parallel programming. Also, the resource statement may be provided at any suitable location, such as at the beginning or the end, to be read by the PFU programmer and controller 204 to ensure proper programming.

Figure 10:
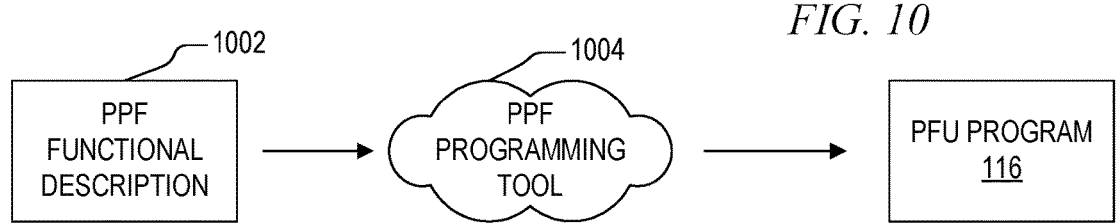
FIG. 10 is a simplified block diagram illustrating an exemplary method of generating the PFU program of FIG. 1 according to one embodiment of the present invention for programming the PFU engine of FIG. 2.

FIG. 10 is a simplified block diagram illustrating an exemplary method of generating the PFU program 116 according to one embodiment of the present invention for programming the PFU engine 202 of the PFU 114. An application generator, such as a programmer or the like, writes a PFU functional description 1002 in a selected format that describes or otherwise defines a memory controller operation for modifying or enhancing the MC 104. The PFU functional description 1002 may otherwise be referred to as a PFU definition. The PFU functional description 1002 may be written in any suitable hardware programming language, such as LegUp, Catapult (by Catapult technology), Verilog, HDL (Hardware Description Language), register control logic (RCL), register transfer logic (RTL), etc. The PFU functional description 1002 is provided to a corresponding PFU programming tool 1004 that is configured to convert the PFU functional description 1002 into the PFU program 116 suitable to program the PFU engine 202 to operate according to the PFU functional description 1002. As an example, the PFU programming tool 1004 may convert the PFU functional description 1002 into a corresponding bitstream that may be used to program one or more of the programmable sections 303 of the programmable logic 301 of the PFU engine 202.

Once the PFU program 116 is generated, it may be stored on the storage 110 at an appropriate location for access by the BIOS 108 or the OS 120 for programming the PFU 114 according to any of the methods previously described. Alternatively, the PFU program 116 may be incorporated into an application, such as the binary APP 502, for programming by the application when executed.

Figure 11:
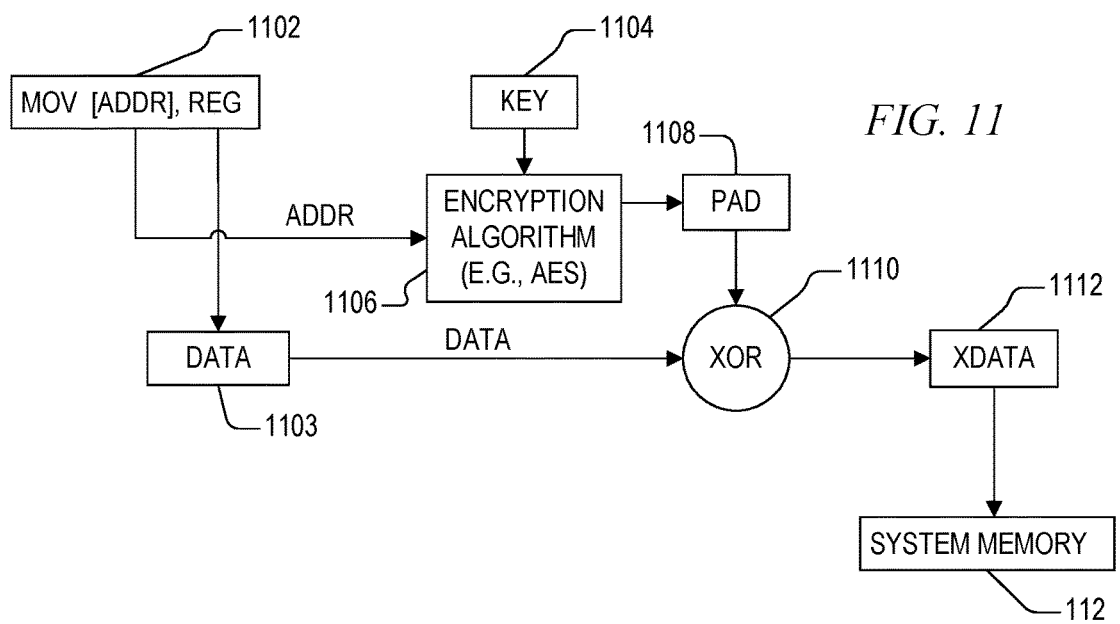
FIG. 11 is a simplified block diagram illustrating an exemplary encryption process that may be programmed into the PFU and performed by the MC when storing data to the system memory of FIG. 1.

FIG. 11 is a simplified block diagram illustrating an exemplary encryption process that may be programmed into the PFU 114 and performed by the MC 104 when storing data to the system memory 112. A move (MOV) instruction 1102 represents any type of store instruction executed by any of the cores of the processor 100 for storing a data value DATA stored in a register (REG) 1103 to a specified address ADDR in the system memory 112. The PFU engine 202 of the PFU 114 is programmed with a KEY 1104 and an encryption algorithm 1106. The KEY 1104 is an arbitrary binary or hexadecimal value that may be predetermined and stored within the PFU program 116. The encryption algorithm 1106 is according to any standard or custom encryption algorithm, such as, for example, the Data Encryption Standard (DES), the RSA public-key system, the MD5 algorithm, the Advanced Encryption Standard (AES), various hashing algorithms, etc.

In operation, the MC 104, as modified by the PFU 114, extracts and applies the address ADDR from the MOV instruction 1102 to one input of the encryption algorithm 1106. The KEY 1104 is applied to another input, and the encryption algorithm 1106 provides a corresponding PAD value 1108 at its output. In other words, the encryption algorithm 1106 essentially converts the KEY 1104 and the ADDR into the PAD value 1108. The DATA value from the REG 1103 is applied to one input of a Boolean logic function, such as an Exclusive-OR (XOR) operation 1110, and the PAD value 1108 is applied to another input, and the XOR operation 1110 performs the indicated Boolean operation (e.g., XOR) and provides a corresponding encrypted data value XDATA 1112 at its output. The MC 104 stores the encrypted XDATA value 1112 at the address ADDR of the system memory 112 rather than the original DATA value.

Figure 12:
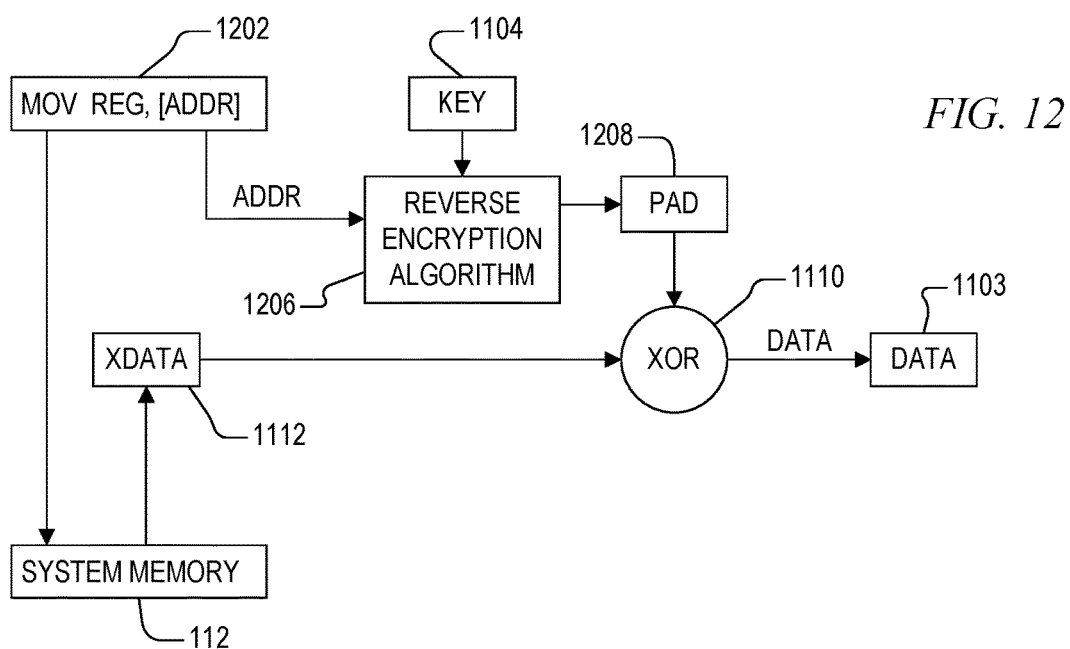
FIG. 12 is a simplified block diagram illustrating a reverse encryption process that may be programmed into the PFU and performed by the MC when loading data from the system memory of FIG. 1.

FIG. 12 is a simplified block diagram illustrating a reverse encryption process that may be programmed into the PFU 114 and performed by the MC 104 when loading data from the system memory 112. The reverse encryption process of FIG. 12 is complementary to the encryption process of FIG. 11, in which both processes are stored together in the PFU program 116 for a complete encryption process for storing and loading information to and from the system memory 112. Another MOV instruction 1202 represents any type of load instruction executed by any of the cores of the processor 100 for loading or reading a data value from an addressed location of the system memory 112 into a specified register, such as REG 1103, of the processor 100.

The address ADDR is extracted from the load instruction 1202 and applied to one input and the KEY 1104 is applied to another input of a reverse encryption algorithm 1206 (or decryption algorithm), which provides a corresponding PAD 1208 at its output. The MOV instruction 1202 is also applied to the system memory 112 to retrieve the encrypted XDATA value 1112. The encrypted XDATA value 1112 and the PAD 1208 are applied to respective inputs of the XOR operation 1110, which outputs a corresponding decrypted data value DATA. The MC 104 stores the DATA value, rather than the retrieved XDATA value 1112, into the REG 1103 as specified by the MOV instruction 1202.

Assuming that the encryption and reverse encryption algorithms 1106 and 1206 are complementary, then the decrypted DATA value retrieved upon execution of the MOV instruction 1202 is identical to the original DATA value initially stored in the REG 1103 prior to execution of the MOV instruction 1102. In this manner, the PFU 114 modifies operation of the MC 104 for encrypting data stored in the system memory 112 and for decrypting data retrieved from the system memory 112. It is noted that for symmetric-key encryption, such as AES, the encryption and algorithm 1106 and the reverse encryption algorithm 1206 are the same (e.g., identical algorithms), so that only one encryption/decryption algorithm is necessary.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

The invention claimed is:

1. A processor, comprising:
  a memory controller for interfacing an external memory;
  a programmable functional unit (PFU) that is programmed by a PFU program to modify operation of said memory controller, wherein said PFU comprises a plurality of programmable logic elements and a plurality of programmable interconnectors and a programmable memory used to receive the PFU program to program selected ones of the plurality of programmable logic elements; and
  a local memory comprising:
    a random-access memory, wherein the processor is responsive to a write command that commands the processor to write said PFU program from said external memory into said random-access memory; and a read only memory that stores at least one predetermined PFU program for programming said PFU to operate according to a predetermined PFU definition, wherein at least one of said at least one predetermined PFU program comprises a default PFU program;

wherein when the PFU does not have sufficient available space to load a next PFU program, at least one PFU program currently within the PFU is overwritten, wherein if any PFU program being overwritten is not stored within the read only memory or the random-access memory, and if the random-access memory has sufficient available storage, the PFU program is copied from the PFU into the random-access memory before it is overwritten in the PFU, wherein the plurality of programmable logic elements each comprises:
- a look-up table (LUT), programmed with corresponding LUT value bits in the programmable memory, receiving a plurality of input values from an instruction operand to select one of the corresponding LUT value bits to be provided at an output of the LUT;
- a latch, having an input coupled to the output of the LUT, and an output of the latch;
- a first multiplexer, having a select input controlled by a corresponding memory bit stored in the programmable memory, a first input coupled to the output of the LUT, a second input coupled to the output of the latch, and an output of the first multiplexer;
- a second multiplexer, having a select input controlled by a corresponding memory bit stored in the programmable memory, a first input coupled to a programmable bit stored in the programmable memory, a second input coupled to one of the plurality of programmable interconnectors, and an output of the second multiplexer;
- an adder, having a first input coupled to the output of the first multiplexer, a second input coupled to the output of the second multiplexer, and an output of the adder; and
- a third multiplexer, having a select input controlled by a corresponding memory bit stored in the programmable memory, a first input coupled to the output of the first multiplexer, a second input coupled to the output of the adder, and an output of the third multiplexer coupled to one of the plurality of programmable interconnectors.

2. The processor of claim 1, further comprising a PFU programmer that programs said PFU using said PFU program stored in said local memory.

3. The processor of claim 2, wherein the processor is responsive to a program command which causes said PFU programmer to program said PFU with a specified one of a plurality of PFU programs stored in said local memory.

4. The processor of claim 1, further comprising a configuration map that maps each of a plurality of different processing modes with a corresponding one of a plurality of PFU programs stored in said local memory.

5. The processor of claim 1, wherein said plurality of programmable logic elements and said plurality of programmable interconnectors are subdivided into a plurality of substantially identical programmable sections, further comprising a PFU programmer that allocates a number of said programmable sections and that programs said allocated number of said programmable sections with said PFU program to program said PFU.

6. The processor of claim 1, wherein said PFU program comprises a bitstream that is scanned into said programmable memory of said PFU.

7. The processor of claim 1, wherein said PFU is programmed with a plurality of PFU programs, further comprising a PFU programmer that enables at least one of said plurality of PFU programs at a time during operation of the processor.

8. The processor of claim 1, wherein said PFU program programs said PFU to perform encryption functions for encrypting data stored in said external memory.

9. The processor core of claim 8, wherein said encryption functions comprise an encryption process and a reverse encryption process that employs a predetermined key that is combined with an address to develop a pad value that is further combined with a data value.

10. A method of providing a programmable memory controller of a processor that interfaces the processor with an external memory, comprising:
- incorporating a programmable functional unit (PFU) comprising a plurality of programmable logic elements, a plurality of programmable interconnectors, and a programmable memory used to receive a PFU program to program selected ones of the plurality of programmable logic elements;
- programming the PFU with the PFU program to modify operation of the programmable memory controller; and
- storing the PFU program in a local memory of the processor;

wherein the local memory comprises a random-access memory and a read only memory;

wherein the processor is responsive to a write command that commands the processor to write said PFU program from said external memory into said random-access memory;

wherein the read only memory stores at least one predetermined PFU program for programming said PFU to operate according to a predetermined PFU definition, wherein at least one of said at least one predetermined PFU program comprises a default PFU program;

wherein when the PFU does not have sufficient available space to load a next PFU program, at least one PFU program currently within the PFU is overwritten, wherein if any PFU program being overwritten is not stored within the read only memory or the random-access memory, and if the random-access memory has sufficient available storage, the PFU program is copied from the PFU into the random-access memory before it is overwritten in the PFU;

wherein the plurality of programmable logic elements each comprises:
- a look-up table (LUT), programmed with corresponding LUT value bits in the programmable memory, receiving a plurality of input values from an instruction operand to select one of the corresponding LUT value bits to be provided at an output of the LUT;
- a latch, having an input coupled to the output of the LUT, and an output of the latch;
- a first multiplexer, having a select input controlled by a corresponding memory bit stored in the programmable memory, a first input coupled to the output of the LUT, a second input coupled to the output of the latch, and an output of the first multiplexer;
- a second multiplexer, having a select input controlled by a corresponding memory bit stored in the programmable memory, a first input coupled to a programmable bit stored in the programmable memory, a second input coupled to one of the plurality of programmable interconnectors, and an output of the second multiplexer;

an adder, having a first input coupled to the output of the first multiplexer, a second input coupled to the output of the second multiplexer, and an output of the adder; and a third multiplexer, having a select input controlled by a corresponding memory bit stored in the programmable memory, a first input coupled to the output of the first multiplexer, a second input coupled to the output of the adder, and an output of the third multiplexer coupled to one of the plurality of programmable interconnectors.

11. The method of claim 10, further comprising providing a PFU programmer and a PFU engine within the PFU in which the PFU programmer programs the PFU engine with the PFU program stored in the local memory.

12. The method of claim 11, further comprising executing, by the processor, a program command that commands the PFU programmer to program the PFU engine with the PFU program stored in the local memory.

13. The method of claim 11, further comprising:
programming a PFU comprises scanning the at least one PFU program as a bitstream into the programmable memory of the PFU engine.

14. The method of claim 10, further comprising providing a configuration map in the PFU that maps each of a plurality of different processing modes with a corresponding one of a plurality of PFU programs stored in the local memory.

15. The method of claim 10, further comprising:
subdividing the plurality of programmable logic elements and the plurality of programmable interconnectors into a plurality of substantially identical programmable sections;

allocating a number of the programmable sections to configure the PFU according to the PFU program; and programming the allocated number of the programmable sections with the at least one PFU program.

16. The method of claim 10, further comprising programming the PFU with a plurality of PFU programs, further comprising enabling at least one of the plurality of PFU programs at a time during operation of the processor.

* * * * *